(12) United States Patent
Gurusamy et al.

(10) Patent No.: US 8,630,752 B2
(45) Date of Patent: Jan. 14, 2014

(54) SYSTEM AND METHOD OF DISPLAYING AIRSPEED INFORMATION FOR AN AIRCRAFT

(75) Inventors: Saravanakumar Gurusamy, Tamil Nadu (IN); Nirupam Karmakar, Bangalore (IN); Pramod Kumar Malviya, Karnataka (IN); Prithvi Krishnamurthy, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 306 days.

(21) Appl. No.: 13/228,117

(22) Filed: Sep. 8, 2011

(65) Prior Publication Data

US 2013/0066486 A1   Mar. 14, 2013

(51) Int. Cl.
*G05D 1/00* (2006.01)

(52) U.S. Cl.
USPC ................... 701/7; 701/8; 701/14; 701/15

(58) Field of Classification Search
USPC ......... 701/7, 8, 9, 3, 14, 15, 16; 244/180–183
See application file for complete search history.

(56) References Cited

U.S. PATENT DOCUMENTS

| 4,638,437 | A | 1/1987 | Cleary et al. |
| 4,837,695 | A | 6/1989 | Baldwin |
| 5,103,224 | A | 4/1992 | Arad |
| 5,353,022 | A | 10/1994 | Middleton et al. |
| 5,797,562 | A | 8/1998 | Wyatt |
| 6,133,857 | A | 10/2000 | Millard et al. |
| 6,822,624 | B2 | 11/2004 | Naimer et al. |
| 6,879,887 | B2 | 4/2005 | Gaidelis, Jr. et al. |
| 6,982,655 | B2 | 1/2006 | Vialleton et al. |
| 7,014,146 | B2 | 3/2006 | Villaume et al. |
| 7,158,052 | B2 | 1/2007 | Zammit-Mangion et al. |
| 7,885,734 | B2 | 2/2011 | Lemoult et al. |
| 8,380,372 | B2 * | 2/2013 | Michal et al. ............ 701/15 |
| 8,527,119 | B2 * | 9/2013 | Chaptal et al. ........... 701/15 |
| 2008/0215198 | A1 | 9/2008 | Richards |
| 2009/0125168 | A1 | 5/2009 | Voisin |

* cited by examiner

*Primary Examiner* — Richard Camby
(74) *Attorney, Agent, or Firm* — Ingrassia Fisher & Lorenz, P.C.

(57) ABSTRACT

A method and a system are provided for displaying flight information of an aircraft. The system receives at least one user defined airspeed related to flight of the aircraft from a user. A processor calculates the at least one calculated airspeed based on data stored in a memory device. A static position is determined by the processor for the user defined and calculated airspeeds. The difference between the positions developed from the user defined and calculated position is also calculated. A difference indicator is displayed to the user for the difference between each user defined and calculated position.

20 Claims, 9 Drawing Sheets

US 8,630,752 B2

SYSTEM AND METHOD OF DISPLAYING AIRSPEED INFORMATION FOR AN AIRCRAFT

TECHNICAL FIELD

The present invention generally relates to system and method for displaying information associated with flight of an aircraft, and more particularly relates to displaying airspeed position information for the aircraft.

BACKGROUND

Modern aircraft computer systems provide an increasing amount of information to the pilot(s) via a display, often in replacement of traditional dial gauges. One type of information are standard airspeeds known as "V-speeds". These V-speeds include, for example, the V2 speed, which is the speed at which an aircraft may safely become airborne with one engine inoperable. Another V-speed is the VFE speed, which is the maximum speed at which flaps may be extended.

Typically pilots have been responsible for determining and/or verifying each necessary V-speed for the aircraft. In recent times, computer systems may also aid in determining these airspeeds. Regardless of the source, it is important to have these V-speeds correctly determined and calculated.

Accordingly, it is desirable to provide a system and method for the display and verification of critical airspeeds, i.e., V-speeds. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for displaying flight information for an aircraft. The method includes the step of storing data associated with the aircraft in a memory device. A first user defined airspeed related to a first aspect of flight of an aircraft is received. A first calculated airspeed related to the first aspect of flight is calculated based on the data associated with the aircraft. The method also includes the step of determining a first user defined static position at which the aircraft should achieve the first user defined airspeed with respect to a starting position of the aircraft. The method further includes determining a first calculated static position at which the aircraft should achieve the first calculated airspeed with respect to the starting position of the aircraft. The difference between the first user defined static position and the first calculated static position is calculated. The method then includes the step of displaying a first position difference indicator indicating the difference between the first user defined static position and the first calculated static position.

A system is provided for displaying flight information of an aircraft. The system includes a memory device for storing data regarding the aircraft. An input device receives a first user defined airspeed related to a first aspect of flight of the aircraft. The system also includes a processor in communication with the memory device and the input device. The processor determines a first user defined static position at which the aircraft should achieve the first user defined static airspeed with respect to a starting position of the aircraft, calculates a first calculated static airspeed related to the first aspect of flight based on the data regarding the aircraft, determines a first calculated static position at which the aircraft should achieve the first calculated static airspeed with respect to the starting position of the aircraft, and calculates the difference between the first user defined static position and the first calculated static position. The system also includes a display for displaying a first position difference indicator indicating the difference between the first user defined static position and the first calculated static position.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring to the Figures, a system 20 and methods of displaying flight information for an aircraft (not shown) are shown and described herein. In one embodiment, the entire system 20 is disposed aboard the aircraft for assisting in operations of the aircraft. However, in other embodiments, all or part of the system 20 may be disposed apart from the aircraft.

Figure 1:
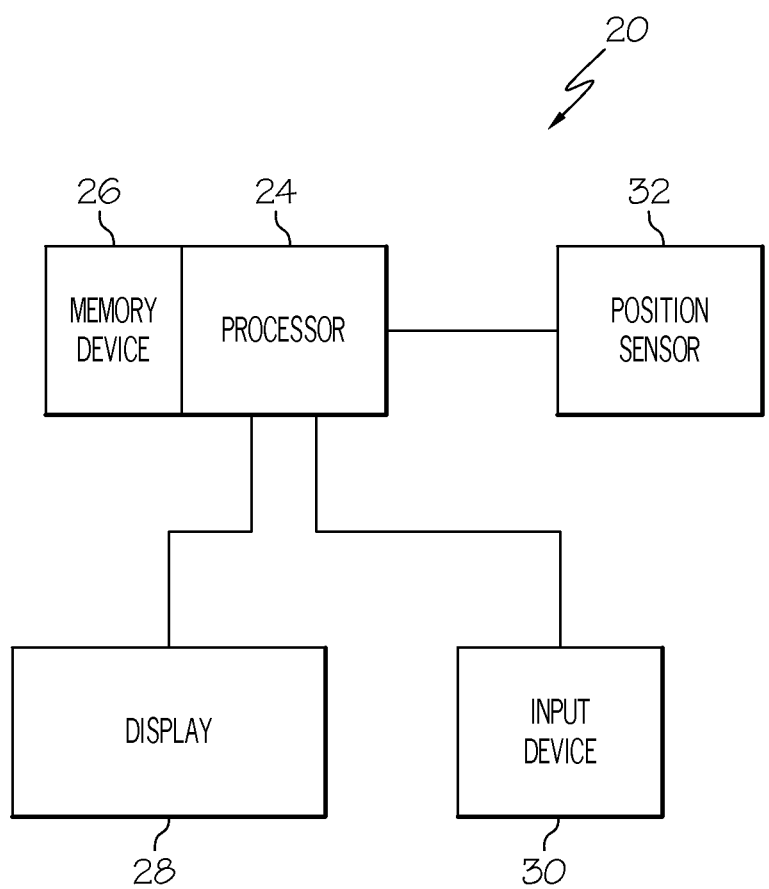
FIG. 1 is a block diagram of a system for displaying flight information of an aircraft.

Referring now to FIG. 1, the system 20 includes a processor 24 for performing calculations. More specifically, the processor 24 of the illustrated embodiment is capable of executing one or more programs (i.e., running software) to perform various tasks instructions encoded in the program(s). The processor 24 may be a microprocessor, microcontroller, application specific integrated circuit (ASIC) or other suitable device as realized by those skilled in the art. Of course, the system 20 may include multiple processors 24, working together or separately, as is also realized by those skilled in the art.

The system 20 also includes a memory device 26 capable of storing data. The memory device 26 may be random access memory (RAM), read-only memory (ROM), flash memory, a memory disk (e.g., a floppy disk, a hard disk, or an optical disk), or other suitable device as realized by those skilled in the art. In the illustrated embodiments, the memory device 26 is in communication with the processor 24 and stores the program(s) executed by the processor 24. Those skilled in the art realize that the memory device 26 may be an integral part of the processor 24. Furthermore, those skilled in the art realize that the system 20 may include multiple memory devices 26.

In the illustrated embodiment, the memory device 26 stores aircraft data associated with the aircraft and/or flight of the aircraft. That is, the aircraft data is related to the physical and/or operation properties of the aircraft. The aircraft data includes, but is not limited to, the type of aircraft, weight, flaps setting, thrust setting, atmospheric pressure, type of runway, length of runway, status of runway (e.g., wet or dry). Accordingly, the method 100 includes the step 102 of storing data associated with the aircraft.

The system 20 also includes a display 28 for displaying information (i.e., data) to a user. In one embodiment, the display 28 is disposed in a cockpit (not shown) of the aircraft such that it may be viewed by the pilot and/or crew of the aircraft. The display 28 may utilize any suitable technology for displaying information, including, but not limited to, a liquid crystal display (LCD), plasma, or a cathode ray tube (CRT). The display 28 is in communication with the processor 24 for receiving data from the processor 24. Those skilled in the art realize numerous techniques to facilitate communication between the display 28 and the processor 24.

The system 20 further includes an input device 30 for receiving data and/or commands from a user. The input device 30 is in communication with the processor 24 such that the data and/or commands input by the user may be received by the processor 24. Those skilled in the art realize numerous techniques to facilitate communication between the input device 30 and the processor 24. The input device 30 may be implemented with any suitable technology, including, but not limited to, a touchscreen interface (e.g., overlaying the display 28), a keyboard, a number pad, a mouse, a touchpad, a roller ball, a pushbutton, and a switch.

The system 20 may also include a position sensor 32 in communication with the processor 24 for providing a current position of the aircraft to the processor 24. In the illustrated embodiment, the position sensor 32 may be implemented as a global position system (GPS) receiver (not separately numbered). The GPS receiver receives radio frequency (RF) signals from GPS satellite and calculates a position therefrom, as is readily appreciated by those skilled in the art. Of course, other techniques may alternatively be utilized to provide the current position of the aircraft to the processor 24.

In the illustrated embodiment, the user utilizes the input device 30 to enter at least one user defined static airspeed, which may be stored in the processor 24 and/or the memory device 26. More specifically, the user, e.g., a plot of the aircraft, will enter multiple user defined airspeeds. These airspeeds, known commonly as V-speeds, relate to one or more aspects of flight of the aircraft. For example, a $V_1$ speed is commonly referred to as the "critical engine failure recognition speed" or the "takeoff decision speed". That is, the $V_1$ speed is the speed at which takeoff of the aircraft will continue even if an engine (not shown) of the aircraft fails. Another example is the $V_R$ speed, or rotation speed, which is the speed at which the nosewheel (not shown) of the aircraft leaves the ground. The user typically enters these V-speeds based on independent calculations. These calculations may take into account numerous factors such as the loading (i.e, weight) of the aircraft, the type of aircraft, and/or prior experience with the aircraft. In alternative embodiments, the user defined airspeeds may be transferred without use of the input device 30, such as an automatic download.

Figure 2:
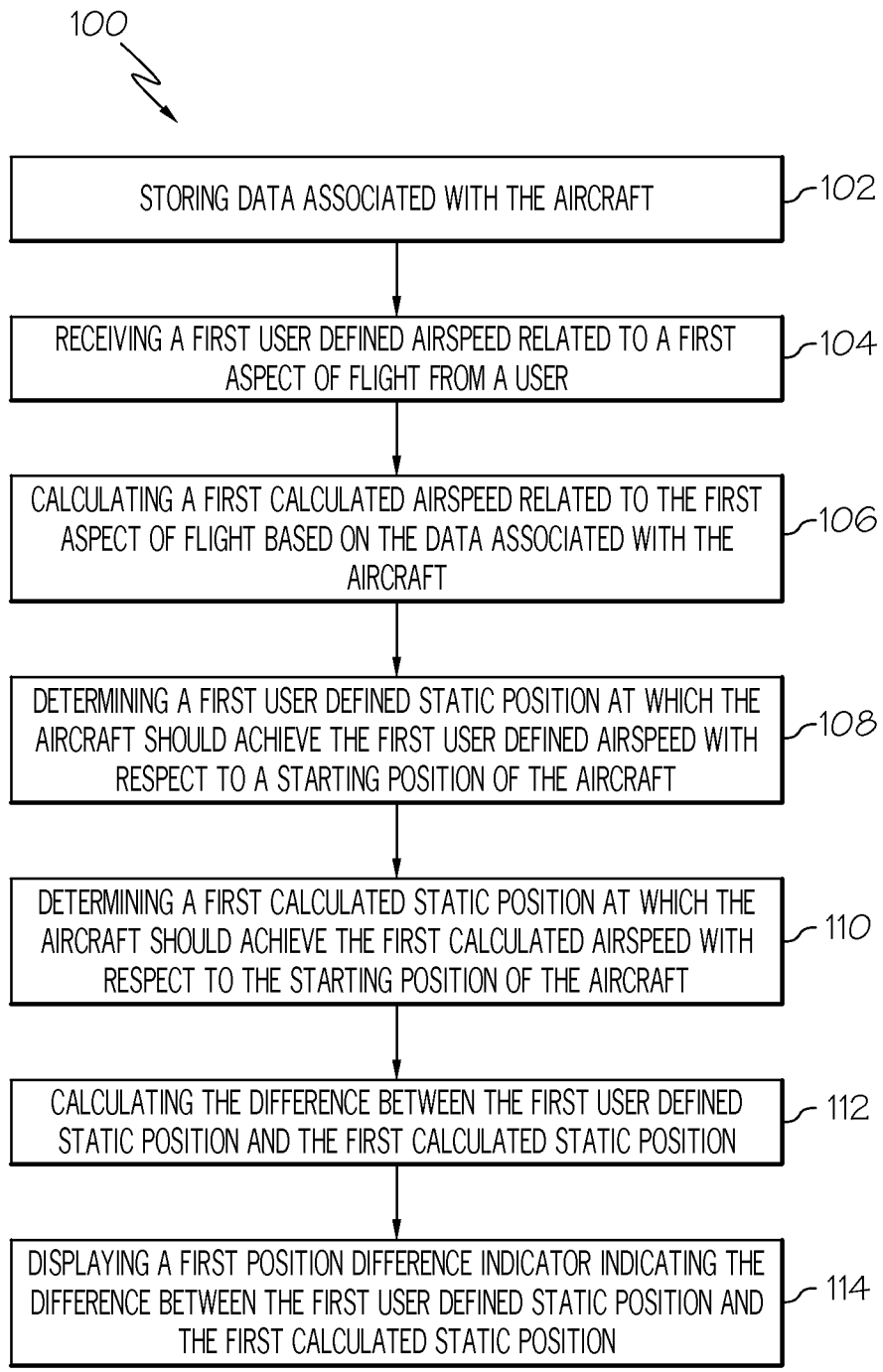
FIG. 2 is a flowchart of a method for displaying flight information of the aircraft.

Accordingly, referring to FIG. 2, the method 100 of displaying flight information for an aircraft includes the step 104 of receiving a first user defined airspeed. The first user defined airspeed is related to a first aspect of flight of the aircraft. In the illustrated embodiment, the first user defined airspeed is the $v_1$ speed. The method may also include the step (not numbered) of receiving a second user defined airspeed related to a second aspect of flight of the aircraft from a user. In the illustrated embodiment, the second user defined airspeed is the $V_R$ speed.

The processor 24 also calculates airspeeds independent from those entered by the user, hereafter referred to as "calculated airspeeds". The processor 24 utilizes the data regarding the aircraft stored in the memory device 26 (e.g., weight, thrust setting, etc.) to perform these calculations. These calculated airspeeds may be used in comparison to the user defined airspeeds, as described in detail further below.

As such, the method includes the step 106 of calculating a first calculated airspeed related to the first aspect of flight based on the data associated with the aircraft. As with the first user defined airspeed, the first calculated static airspeed is also the $V_1$ speed. The method may also include the step (not numbered) of calculating a second user defined airspeed related to a second aspect of flight of the aircraft based on the data associated with the aircraft. In the illustrated embodiment, the second calculated airspeed is also the $V_R$ speed.

Utilizing the user defined and calculated airspeeds, the processor 24 determines static positions at which the aircraft should achieve each user defined and calculated static airspeed. This calculation is dependent on a starting position of the aircraft as well as an acceleration profile of the aircraft. The static positions are referred to as "static" as they become fixed once determined and do not change with subsequent changes in position of the aircraft.

In the case of an aircraft takeoff, the starting position is typically a position on a runway at which the aircraft begins its takeoff sequence, e.g., an end of the runway. The starting position may be expressed as geometric coordinates, e.g., 42.2081, −83.35104, or other suitable nomenclature as appreciated by those skilled in the art. The starting position may be obtained by, for example, the user entering the coordinates with the input device 30, being automatically determined by the processor 24 after entry of a particular runway number (e.g., 3L at KDTW), or received from the position sensor 32 when the user indicates that the aircraft is at the starting position. In the case of an aircraft landing, the starting position may be received from the position sensor 32 or from a marker position in the flight path of the aircraft.

The method therefore includes the step 108 of determining a first user defined static position at which the aircraft should achieve the first user defined airspeed with respect to a starting position of the aircraft. In the illustrated embodiment, the first user defined static position may be referred to as the user defined static $V_1$ position. The method also includes the step 110 of determining a first calculated static position at which the aircraft should achieve the first calculated airspeed with respect to the starting position of the aircraft. In the illustrated embodiment, the first calculated static position may be referred to as the calculated static $V_1$ position.

The method may also include determining a second user defined static position at which the aircraft should achieve the second user defined airspeed with respect to the starting position of the aircraft. In the illustrated embodiment, the second user defined static position may be referred to as the user defined static $V_R$ position. Furthermore, the method may include determining a second calculated static position at which the aircraft should achieve the second calculated airspeed with respect to the starting position of the aircraft. In the illustrated embodiment, the second user defined static position may be referred to as the user defined static $V_R$ position.

Figure 3:
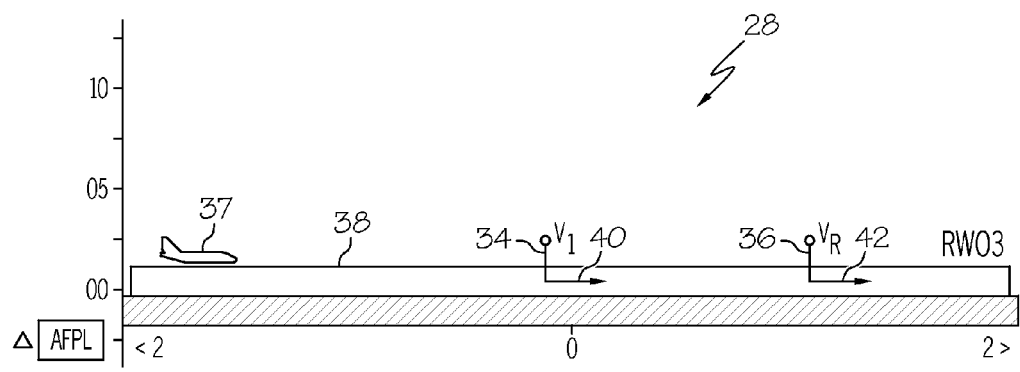
FIG. 3 is a graphical display showing a side view of a runway with a pair of static position markers and a pair of position difference indicators disposed on the runway.
Figure 4:
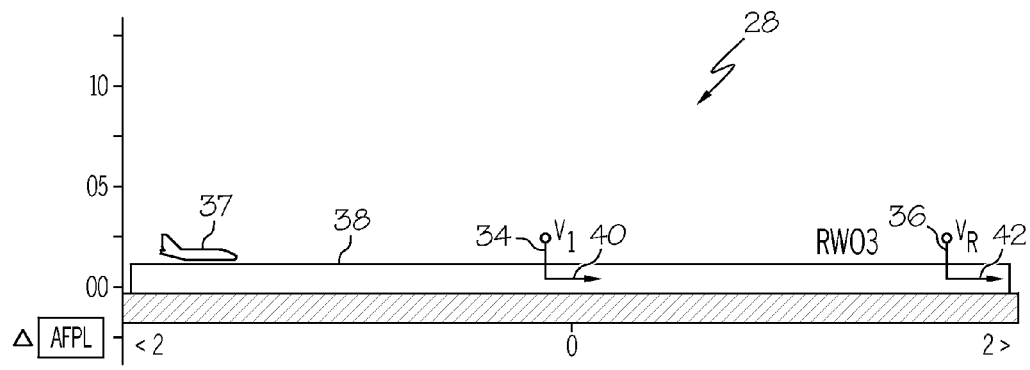
FIG. 4 is a graphical display showing a side view of the runway with a pair static position markers disposed and a pair of position difference indicators disposed on the runway, with one of the position difference indicators extending past an end of the runway.
Figure 5:
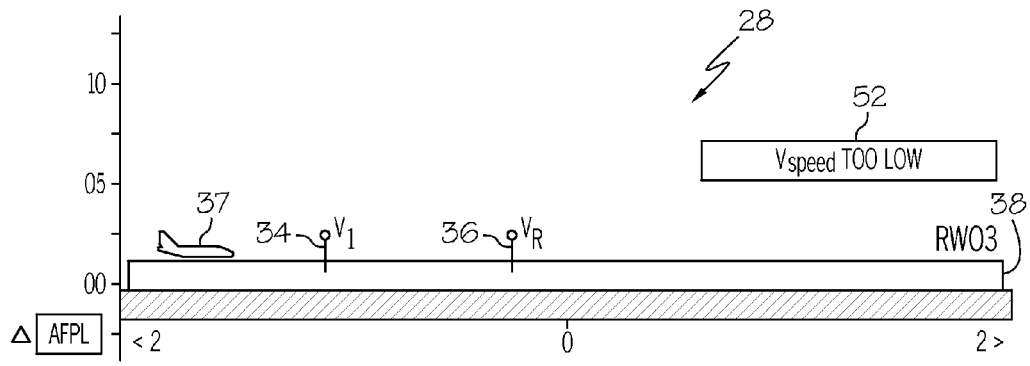
FIG. 5 is a graphical display showing a side view of the runway with a pair of static position markers disposed on the runway and a warning message indicating that user defined airspeeds are too low.

The static positions may be displayed on the display 28. Specifically, and referring to FIGS. 3-12, one or more markers 34, 36 are utilized to denote the static positions. The markers 34, 36 are spaced from one another on the display 28 in proportion to their positions relative to one another. Furthermore, an icon 37 displayed on the display 28 is utilized to denote the current position of the aircraft. In the illustrated embodiment, the icon 37 and markers 34, 36 are superimposed on an image of a runway 38. More specifically, in the illustrated embodiment as shown in FIG. 3, a first user defined static position marker 34 corresponding to the first user defined static position and a second user defined static position marker 36 corresponding to the second user defined static position are shown on the display 28. Of course, in other embodiments, calculated static position markers (not shown) corresponding to the first and second calculated static positions may be displayed on the display 28 in addition to or in place of the user defined static position markers 34, 36.

The processor 24 may also calculate the difference, i.e., the distance, between the user defined static positions and their associated calculated static positions. For example, the difference between the first user defined static position and the first calculated static position is determined. As such a first position variance, representing a variance in the $V_1$ position, is determined. Likewise, the difference between the second user defined static position and the second calculated static position may also be determined. As such a second position variance, representing a variance in the $V_R$ position, is determined The difference between user defined static positions and their associated calculated static positions may be displayed on the display 28. Specifically, in the illustrated embodiment, a first position difference indicator 40 representing the difference between the first user defined static position and the first calculated static position is displayed, as is shown in FIGS. 3, 4, and 8-12. Furthermore, a second position difference indicator 42 representing the difference between the second user defined static position and the second calculated static position may be displayed. The length of each position difference indicators 40, 42 is variable based on the difference between the user defined static position and the associated calculated static position: the larger the difference, the longer the length.

In the illustrated embodiment, the first and second position difference indicators 40, 42 are each represented by an arrow extending from the user defined static positions markers 34, 36. However, other suitable symbols and/or graphics may be implemented as the position difference indicators 40, 42. Furthermore, the position difference indicators 40, 42 may alternately be displayed on the display 28 without the static position markers 34, 36.

Accordingly, referring again to FIG. 2, the method includes the step 114 of displaying a first position difference indicator 40 indicating the difference between the first user defined static position and the first calculated static position. The method may also include displaying a second position difference indicator 42 indicating the difference between the second user defined static position and the second calculated static position. The method may further include displaying one of the first user defined static position marker 36 and the first calculated static position marker (not shown) simultaneously with the first position difference indicator 40 indicating the difference between the first user defined static position and the first calculated static position. Moreover, the method may further include displaying one of the second user defined static position marker 36 and the second calculated static position marker (not shown) simultaneously with the second position difference indicator 42 indicating the difference between the second user defined static position and the second calculated static position.

Referring again to FIGS. 3, 4, and 8-12, the position difference indicators 40, 42 provide a convenient and useful mechanism to ensure that critical airspeeds (i.e., V-speeds) provided by the user (e.g., the pilot) are accurate. Specifically, the indicators 40, 42 allow the user to quickly ascertain whether or not the critical airspeeds are reasonable, since a user supplied static airspeed that varies greatly from the calculated static airspeed will be represented by a length position difference indicator 40, 42. As such, critical errors in the flight may be avoided.

The processor 24 may also determine one or more dynamic positions related to one of the user provided or calculated airspeeds. The dynamic positions are based on the current position of the aircraft. The current position may be provided by the position sensor 32, as described above. The current speed and acceleration of the aircraft may also be utilized to determine each dynamic position. The current speed and acceleration may also be provided by the position sensor 32.

Accordingly, the method may include the step of determining a first dynamic position at which the aircraft should achieve one of the first user defined airspeed and the first calculated airspeed with respect to the current position of the aircraft. The method may also include the step of determining a second dynamic position at which the aircraft should achieve one of the second user defined airspeed and the second calculated airspeed with respect to the current position of the aircraft.

The current position of the aircraft and the dynamic positions related to the airspeeds may also be displayed on the display 28. Specifically, and referring to FIGS. 3-12, the icon 37 is utilized to denote the current position of the aircraft. Referring to FIGS. 6, 7, and 10-12 one or more dynamic position markers 46, 48 are utilized to denote the dynamic positions. The icon 37 and markers 46, 48 are spaced from one another on the display 28 in proportion to their positions relative to one another. Furthermore, the position of the dynamic position markers 46, 48 on the display 28 may change as a result of the dynamic positions changing as the aircraft moves. The dynamic position markers 46, 48 may have a different color than the static markers 34, 36 so that the different types of markers can be easily and readily ascertained.

Figure 6:
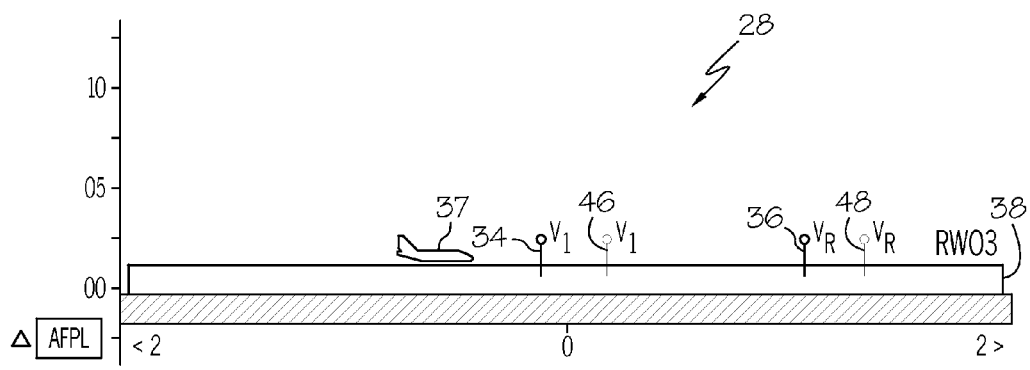
FIG. 6 is a graphical display showing a side view of the runway with the pair of static position markers and a pair of dynamic position markers disposed on the runway.
Figure 10:
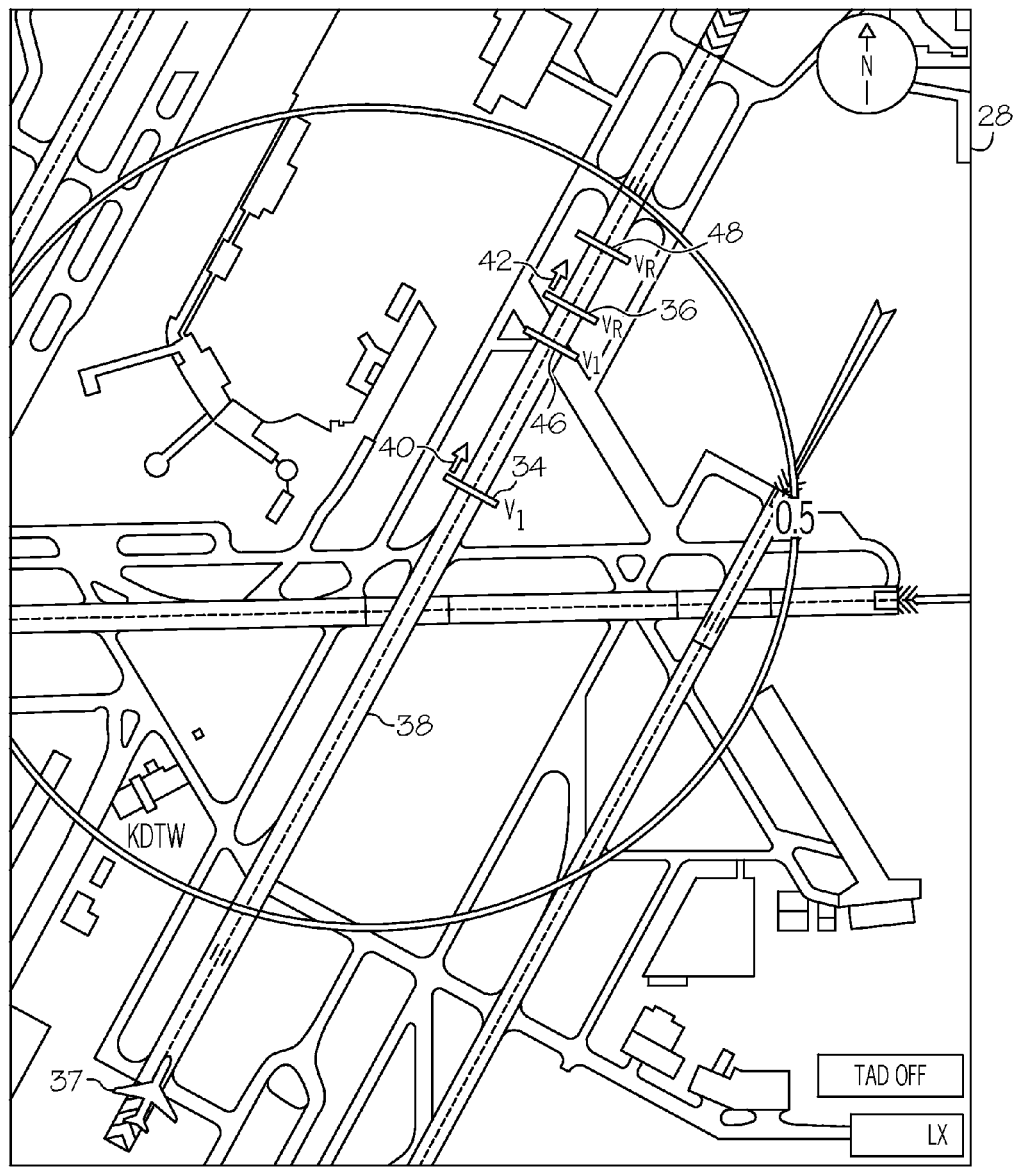
FIG. 10 is a graphical display showing a top view of the runway with a pair of static position markers, a pair of dynamic position makers, and a pair of position difference indicators disposed on the runway.
Figure 11:
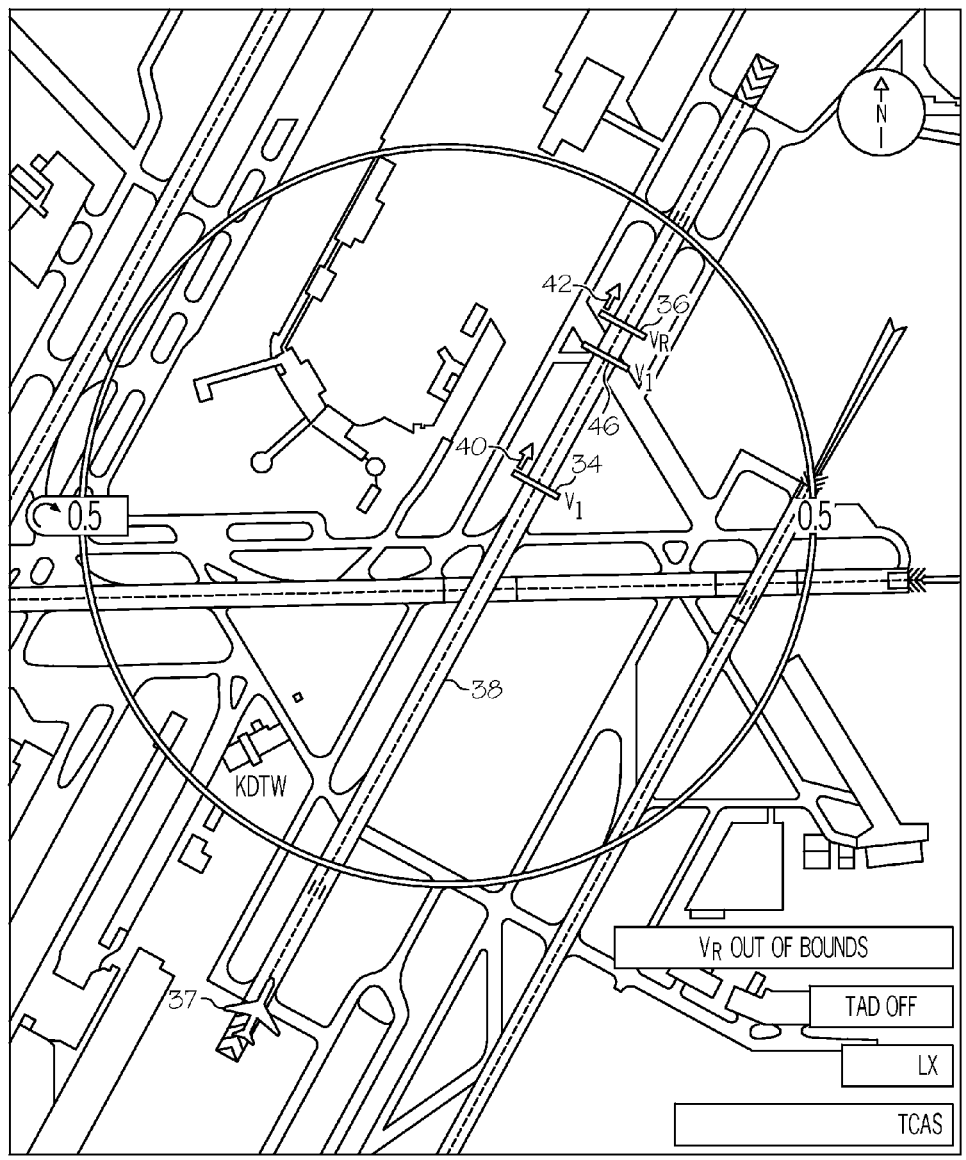
FIG. 11 is a graphical display showing a top view of the runway with a pair of static position markers disposed on the runway, a pair of position difference indicators, one dynamic position marker disposed on the runway, and a warning message indicating that another of the dynamic position markers is not disposable on the runway.

In the illustrated embodiment, the markers 46, 48 are disposed (or superimposed) on the image of the runway 38, as described above. More specifically, in the illustrated embodiment as shown in FIGS. 6 and 10, a first dynamic user defined position marker 46 corresponding to the first user defined airspeed and a second dynamic user defined position marker 48 corresponding to the second user defined airspeed are shown on the display 28. Of course, in other embodiments, calculated dynamic position markers (not shown) may correspond to the first and second calculated airspeeds and may be displayed on the display 28 in addition to or in place of the dynamic user defined position markers 46, 48.

Figure 7:
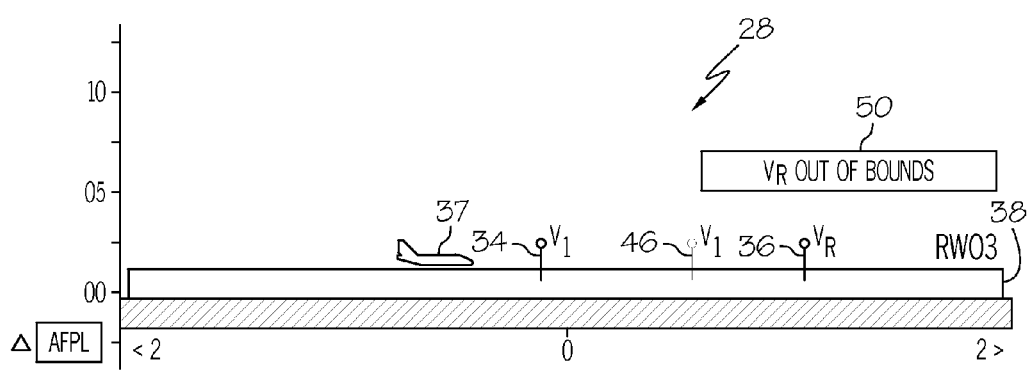
FIG. 7 is a graphical display showing a side view of the runway with a pair of static position markers disposed on the runway, one dynamic position marker disposed on the runway, and a warning message indicating that another of the dynamic position markers is not disposable on the runway.
Figure 8:
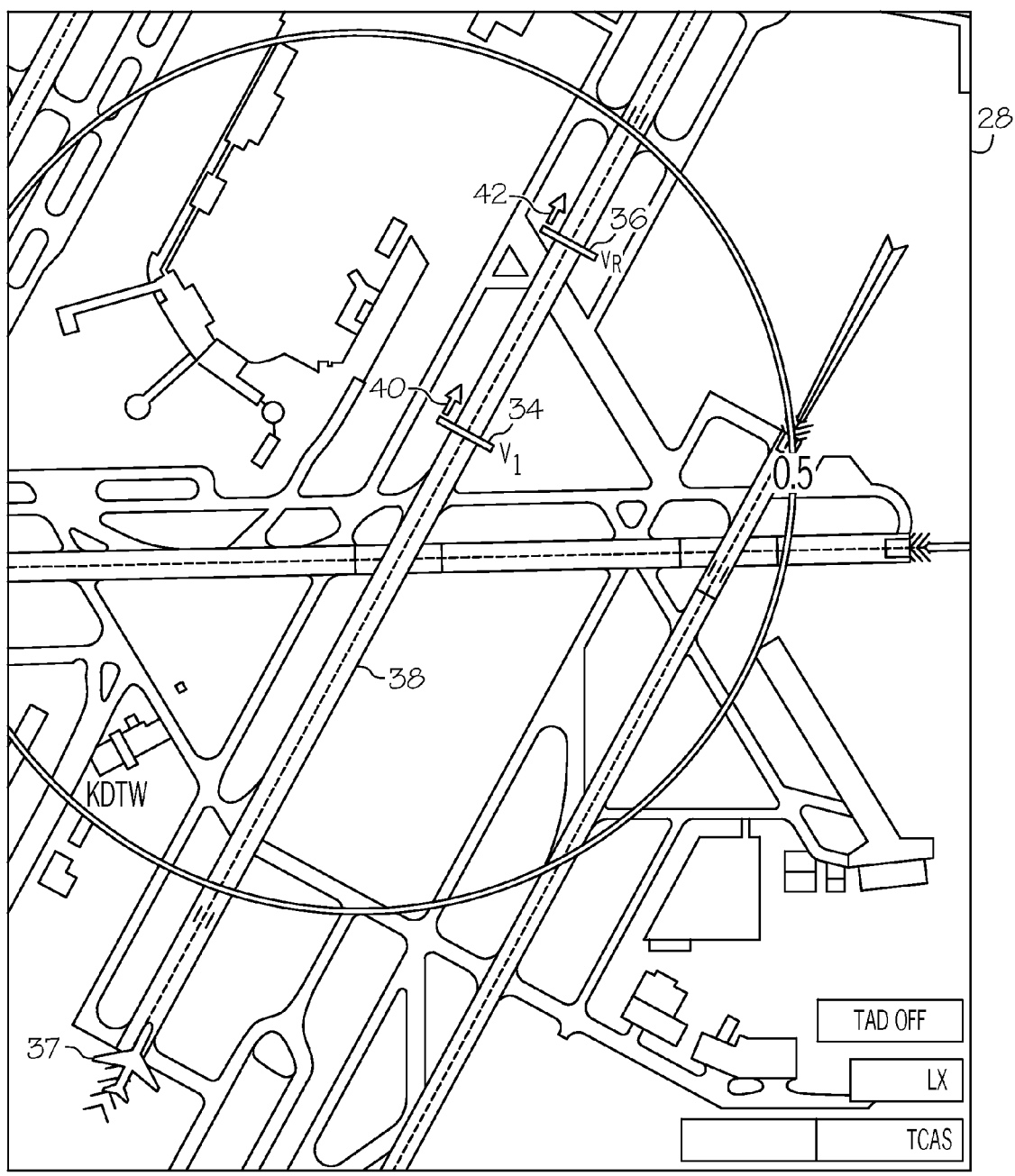
FIG. 8 is a graphical display showing a top view of the runway with a pair of static position markers and a pair of position difference indicators disposed on the runway.
Figure 9:
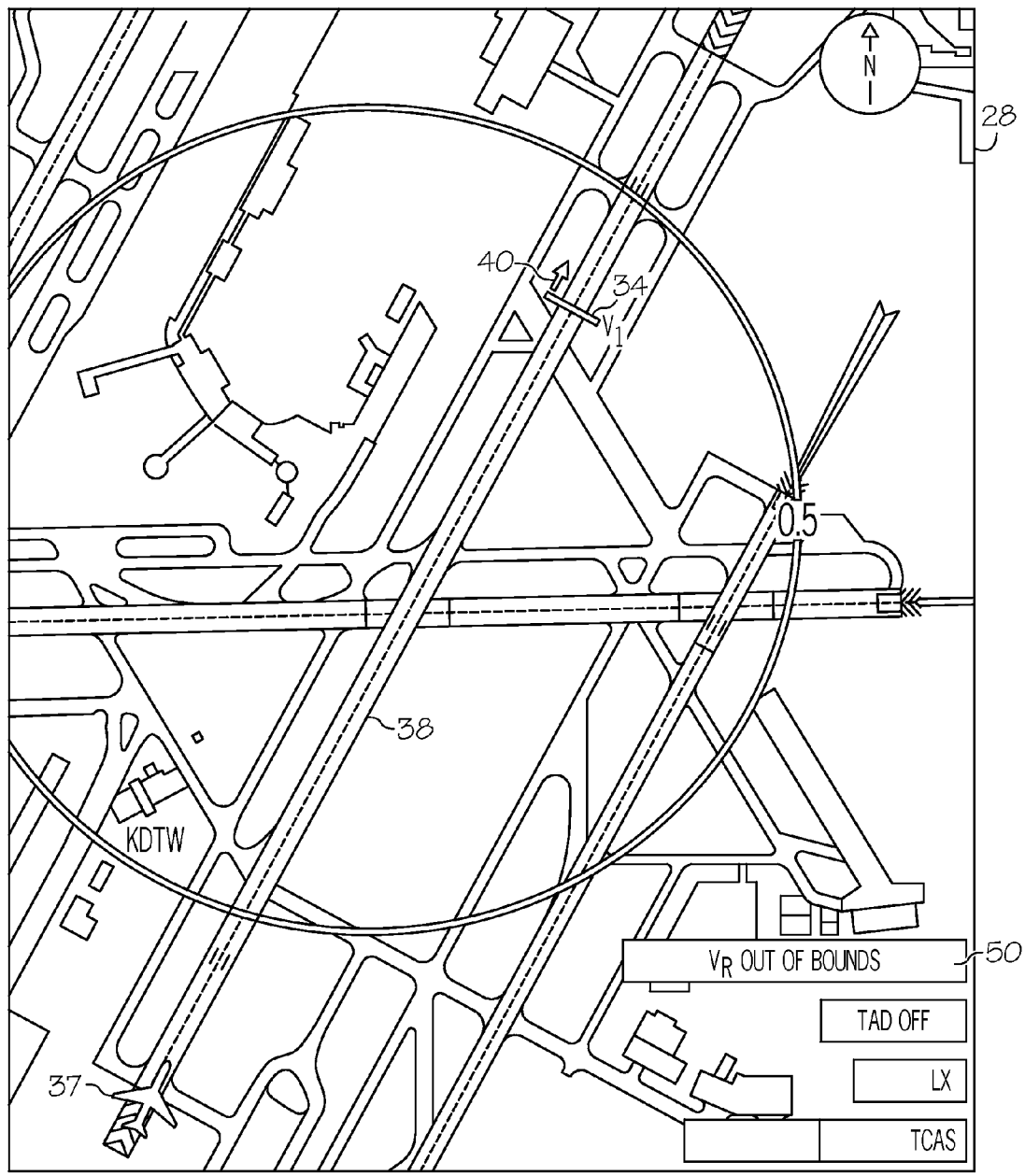
FIG. 9 is a graphical display showing a top view of the runway with one static position marker and a warning message disposed on the runway indicating that another static position marker is not disposable on the runway.

The processor 24 and display 28 may provide mechanisms to alert the user when certain user entered and calculated positions may be of concern to the user (i.e., the pilot of the aircraft). In one example, the processor 24 and display 28 of the illustrated embodiment provide a warning message 50 to the user when one of the positions are not located on the runway, as shown in FIGS. 7 and 9. That is, the positions are farther away from the starting positions than then length of the runway allows. Said yet another way, the processor 24 and display 28 warn when one of the positions are "out of bounds". In another example, referring to FIG. 4, the display 28 of the illustrated embodiment may change the color of the second position difference indicator 42 when the indicator 42 extends past the end of the runway. As yet another example, referring to FIG. 5, the display 28 of the illustrated embodiment displays a warning message 52 that the user entered airspeeds are too low for take off.

Figure 12:
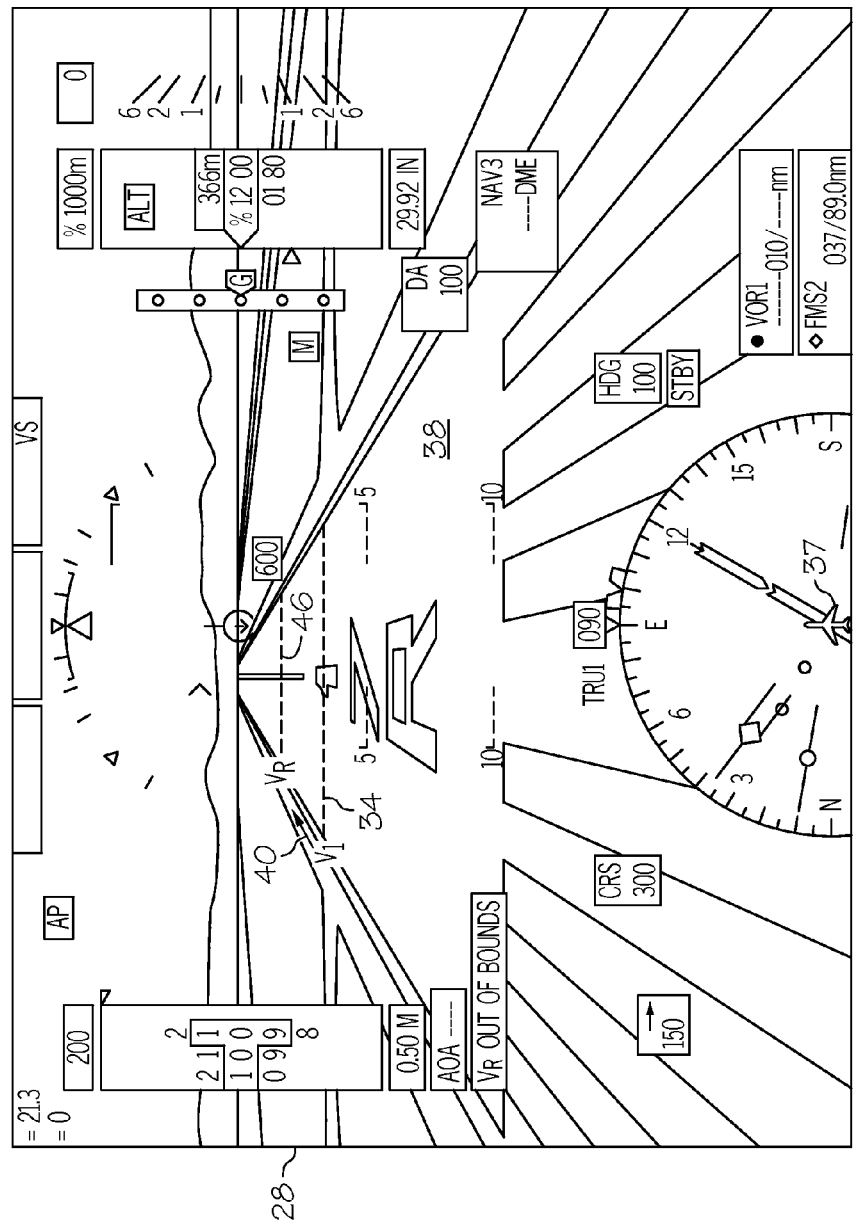
FIG. 12 is a graphic display showing a perspective view of the runway with a static position marker, a position difference indicator, and a dynamic position marker disposed on the runway.

The runway 38, the current position icon 37, the markers 34, 36, 46, 48, and the indicators 40, 42 may be represented by several different techniques on the display 28. As can be seen with reference FIGS. 3-7, a side or profile view of the runway 38 may be provided. Alternatively, as shown in FIGS. 8-11, a top view of the runway 38 is provided. This top view of the runway 38 may be part of an "Airport Moving Map", which provides detail on not only the runway 38 in question, but other runways and airport facilities. A perspective view of the runway 38 may also be provided, as shown in FIG. 12. This display may be referred to commonly as a "Synthetic Vision Display" by those skilled in the art. In summary, the current position icon 37, the markers 34, 36, 46, 48, and the indicators 40, 42, may each be selectively represented in the profile view, top view, and/or the perspective view While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying flight information for an aircraft, said method comprising the steps of:
   storing data associated with the aircraft in a memory device;
   receiving a first user defined airspeed related to a first aspect of flight of an aircraft;
   calculating a first calculated airspeed related to the first aspect of flight based on the data associated with the aircraft;
   determining a first user defined static position at which the aircraft should achieve the first user defined airspeed with respect to a starting position of the aircraft;
   determining a first calculated static position at which the aircraft should achieve the first calculated airspeed with respect to the starting position of the aircraft;
   calculating the difference between the first user defined static position and the first calculated static position; and
   displaying a first position difference indicator indicating the difference between the first user defined static position and the first calculated static position.

2. A method as set forth in claim 1 further comprising the step of displaying a marker denoting one of the first user defined static position and the first calculated static position.

3. A method as set forth in claim 2 further comprising the step of determining a first calculated dynamic position at which the aircraft should achieve one of the first user defined airspeed and the first calculated airspeed with respect to a current position of the aircraft.

4. A method as set forth in claim 3 further comprising displaying a marker denoting the first dynamic position.

5. A method as set forth in claim 1 further comprising the step of receiving a second user defined airspeed related to a second aspect of flight of the aircraft.

6. A method as set forth in claim 5 further comprising the step of determining a second user defined static position at which the aircraft should achieve the second user defined airspeed with respect to a starting position of the aircraft.

7. A method as set forth in claim 6 further comprising the step of calculating a second calculated airspeed related to the second aspect of flight based on the data associated with the aircraft.

8. A method as set forth in claim 7 further comprising the step of determining a second calculated static position at which the aircraft should achieve the second calculated airspeed with respect to the starting position of the aircraft.

9. A method as set forth in claim 8 further comprising the step of calculating the difference between the second user defined static position and the second calculated static position.

10. A method as set forth in claim 9 further comprising the step of displaying a second position difference indicator indicating the difference between the second user defined static position and the second calculated static position.

11. A method as set forth in claim 10 further comprising the step of determining a second dynamic position at which the aircraft should achieve one of the second user defined airspeed and the second calculated airspeed with respect to a current position of the aircraft.

12. A method as set forth in claim 3 further comprising displaying a marker denoting the first dynamic position.

13. A method as set forth in claim 1 further comprising the step of displaying an icon representing a current position of the aircraft in proportional relationship to the first position difference indicator.

14. A method as set forth in claim 1 further comprising the step of displaying a representation of a runway with the first position difference indicator superimposed on the runway.

15. A method as set forth in claim 14 wherein the representation of the runway is further defined as a perspective view of the runway from a current position of the aircraft.

16. A method as set forth in claim 1 further comprising the step of evaluating whether one of the airspeeds and/or static positions is in error.

17. A method as set forth in claim 16 further comprising the step of displaying a warning message if one of the airspeeds and/or static positions is in error.

18. A system for displaying flight information of an aircraft, said system comprising:
 a memory device for storing data regarding the aircraft;
 an input device for receiving a first user defined airspeed related to a first aspect of flight of the aircraft;
 a processor in communication with said memory device and said input device for determining a first user defined static position at which the aircraft should achieve the first user defined static airspeed with respect to a starting position of the aircraft, calculating a first calculated static airspeed related to the first aspect of flight based on the data regarding the aircraft, determining a first calculated static position at which the aircraft should achieve the first calculated static airspeed with respect to the starting position of the aircraft, and calculating the difference between the first user defined static position and the first calculated static position; and
 a display for displaying a first position difference indicator indicating the difference between the first user defined static position and the first calculated static position.

19. A system as set forth in claim 18 wherein said processor determines a first calculated dynamic position at which the aircraft should achieve one of the first user defined airspeed and the first calculated airspeed with respect to a current position of the aircraft.

20. A system as set forth in claim 19 wherein said display displays a marker denoting the first dynamic position.

\* \* \* \* \*